United States Patent
Takeda et al.

(10) Patent No.: US 9,028,746 B2
(45) Date of Patent: May 12, 2015

(54) BUILD-UP WELDING MATERIAL, DEPOSITED METAL, AND MEMBER WITH DEPOSITED METAL

(75) Inventors: Tsutomu Takeda, Takasago (JP); Ryuichi Kobayashi, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 252 days.

(21) Appl. No.: 13/822,893

(22) PCT Filed: Sep. 28, 2011

(86) PCT No.: PCT/JP2011/005449
§ 371 (c)(1),
(2), (4) Date: Mar. 13, 2013

(87) PCT Pub. No.: WO2012/042861
PCT Pub. Date: Apr. 5, 2012

(65) Prior Publication Data
US 2013/0171472 A1      Jul. 4, 2013

(30) Foreign Application Priority Data

Sep. 30, 2010    (JP) ................................. 2010-222861

(51) Int. Cl.
*C22C 38/02* (2006.01)
*C22C 38/04* (2006.01)
*C22C 38/34* (2006.01)
(Continued)

(52) U.S. Cl.
CPC ......... *B23K 35/3086* (2013.01); *B23K 35/0261* (2013.01); *B23K 35/24* (2013.01); *B23K 35/30* (2013.01); *B23K 35/3053* (2013.01); *B23K 35/308* (2013.01); *C21D 2211/004* (2013.01); *C21D 2211/005* (2013.01); *C23C 30/00* (2013.01); *C22C 38/02* (2013.01);
(Continued)

(58) Field of Classification Search
CPC ...... B23K 9/04; B23K 35/0261; B23K 35/24; B23K 35/30; B23K 35/3053; B23K 35/308; B23K 35/3086; C22C 38/02; C22C 38/04; C22C 38/34; C22C 38/44; C22C 38/46
USPC ................. 420/67, 68, 69; 148/325; 428/683; 219/137 WM
See application file for complete search history.

(56) References Cited

U.S. PATENT DOCUMENTS 4,443,406 A * 4/1984 Sukekawa et al. .......... 420/586.1
4,499,158 A * 2/1985 Onuma et al. ................ 428/682
(Continued)

FOREIGN PATENT DOCUMENTS

CN    1443624 A    9/2003
CN    1623720 A    6/2005
(Continued)

OTHER PUBLICATIONS

Derwent abstract of JP 2010/196108; Sep. 2010.*
(Continued)

*Primary Examiner* — Helene Klemanski
(74) *Attorney, Agent, or Firm* — Oblon, McClelland, Maier & Neustadt, L.L.P.

(57) ABSTRACT

Provided a build-up welding material which contains C: 0.2 to 1.5 mass %, Si: 0.5 to 2 mass %, Mn: 0.5 to 2 mass %, Cr: 20 to 40 mass %, Mo: 2 to 6 mass %, Ni: 0.5 to 6 mass %, V: 1 to 5 mass % and W: 0.5 to 5 mass %, with the balance being Fe and unavoidable impurities.

13 Claims, 11 Drawing Sheets

(51) Int. Cl.
*C22C 38/44* (2006.01)
*C22C 38/46* (2006.01)
*B23K 35/30* (2006.01)
*B23K 9/04* (2006.01)
*B23K 35/02* (2006.01)
*B23K 35/24* (2006.01)
*C23C 30/00* (2006.01)

(52) U.S. Cl.
CPC ............... *C22C 38/04* (2013.01); *C22C 38/44* (2013.01); *C22C 38/46* (2013.01); *C22C 38/34* (2013.01)

(56) References Cited

U.S. PATENT DOCUMENTS

| | | | |
|---|---|---|---|
| 5,601,411 | A | 2/1997 | Usami et al. |
| 5,628,449 | A * | 5/1997 | Onuma et al. ............ 228/262.41 |
| 5,879,132 | A | 3/1999 | Usami et al. |
| 2003/0219352 | A1 | 11/2003 | Ohta et al. |
| 2007/0187379 | A1 | 8/2007 | Osuki et al. |
| 2010/0189588 | A1 | 7/2010 | Kawatsu et al. |
| 2011/0300016 | A1* | 12/2011 | Heath ............................. 420/12 |
| 2014/0322560 | A1* | 10/2014 | Kobayashi et al. ............ 428/683 |

FOREIGN PATENT DOCUMENTS

| | | | | |
|---|---|---|---|---|
| CN | 101505910 A | | 8/2009 | |
| JP | 59/225805 | * | 12/1984 | |
| JP | 60 177993 | | 9/1985 | |
| JP | 63248596 A | * | 10/1988 | ............ B23K 35/30 |
| JP | 6-170584 A | | 6/1994 | |
| JP | 07/116780 | * | 5/1995 | |
| JP | 8 1375 | | 1/1996 | |
| JP | 11 226778 | | 8/1999 | |
| JP | 2002 331382 | | 11/2002 | |
| JP | 2006-045597 A | | 2/2006 | |
| JP | 2006 152381 | | 6/2006 | |
| JP | 2006326609 A | * | 12/2006 | |
| JP | 2010196108 A | * | 9/2010 | |

OTHER PUBLICATIONS

Derwent abstract of JP 59/225805; Dec. 1984.*
Derwent abstract of JP 07/116780; May 1995.*
Written Opinion Issued in PCT/JP11/05449 Filed Sep. 28, 2011 (with partial English translation).
International Search Report Issued Dec. 13, 2011 in PCT/JP11/05449 Filed Sep. 28, 2011.

* cited by examiner

FIG.11
COMPARATIVE EXAMPLE 18
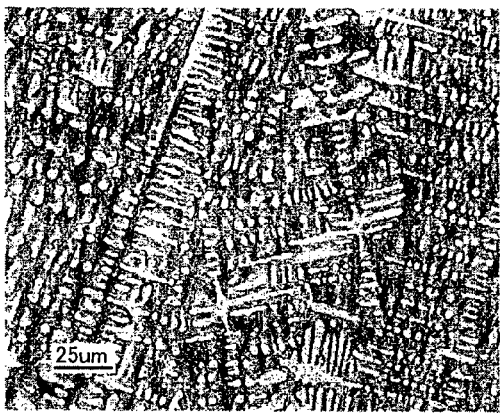
COMPARATIVE EXAMPLE 19
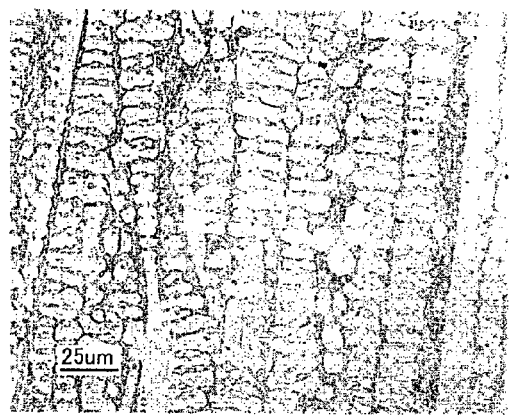
COMPARATIVE EXAMPLE 20
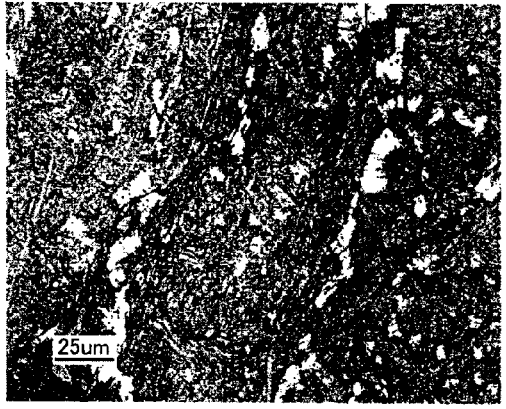
COMPARATIVE EXAMPLE 21
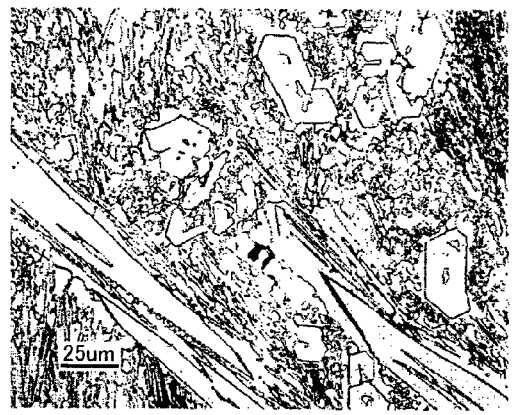

BUILD-UP WELDING MATERIAL, DEPOSITED METAL, AND MEMBER WITH DEPOSITED METAL

TECHNICAL FIELD

The present invention relates to a build-up welding (overlay welding) material, a deposited metal and a member with the deposited metal, and more particularly to a build-up welding material, a deposited metal and a member with the deposited metal, which are suitable for use in a processing apparatus requiring both high corrosion resistance and high abrasion resistance.

BACKGROUND ART

In a processing apparatus such as a pulverizer or a reactor, there are some cases where a target substance comprising a strong acid such as hydrochloric acid or sulfuric acid is treated under an acidic corrosive environment. A treatment container for containing such a target substance is fabricated by subjecting general steel materials to welding. For this reason, an inner wall of the treatment container is likely to be damaged due to not only abrasive wear but also corrosion by the target substance. It is therefore desired to provide an inner wall (welding member) having corrosion resistance and abrasion resistance.

Meanwhile, the following Patent Document 1 discloses a deposited metal produced by build-up welding (overlay welding), wherein it has oxidation resistance and abrasion resistance and exhibits high hardness, at a temperature of 600° C. or more. The deposited metal comprises C: 0.5 to 3.0%, Si: 3.0 to 7.0%, Cr: 25 to 45%; Mn: 0 to 10% and Ni: 0 to 13%, wherein the following relation is satisfied: $Cr \geq -1.6\ Si+37$, and the balance of the composition consists of Fe and unavoidable impurities, and wherein the deposited metal has a metal microstructure in which short fiber-shaped carbide pieces are precipitated finely and in large numbers. The Patent Document 1 also discloses a build-up welding material for forming the deposited metal. The build-up welding material comprises C: 0.5 to 3.0%, Si: 3.0 to 7.0%, Cr: 25 to 45%; Mn: 0 to 10% and Ni: 0 to 13%, wherein the following relation is satisfied: $Cr \geq -1.6\ Si+37$, and the balance of the composition consists of Fe and unavoidable impurities.

LIST OF PRIOR ART DOCUMENTS

Patent Documents

Patent Document 1: JP 11-226778A

SUMMARY OF THE INVENTION

Although the deposited metal disclosed in the Patent Document 1 exhibits high-temperature oxidation resistance, high-temperature abrasion resistance and high-temperature high hardness, corrosion resistance against a strong acid at a lower temperature (e.g., room temperature) is unknown. Moreover, this deposited metal exhibits extremely high hardness of 550 or more in terms of Vickers hardness, which gives rise to concerns about aggressive abrasion when it is used for the inner wall of the treatment container.

The present invention has been made in view of such circumstances, and an object thereof is to provide a deposited metal having excellent corrosion resistance and abrasion resistance as well as toughness, at room temperature, a member with the deposited metal, and a build-up welding material for forming the deposited metal.

According to one aspect of the present invention, there is provided a build-up welding material which contains C: 0.2 to 1.5 mass %, Si: 0.5 to 2 mass %, Mn: 0.5 to 2 mass %, Cr: 20 to 40 mass %, Mo: 2 to 6 mass %, Ni: 0.5 to 6 mass %, V: 1 to 5 mass % and W: 0.5 to 5 mass %, with the balance being Fe and unavoidable impurities.

According to another aspect of the present invention, there is provided a deposited metal produced by build-up welding, which contains C: 0.2 to 1.5 mass %, Si: 0.5 to 2 mass %, Mn: 0.5 to 2 mass %, Cr: 20 to 40 mass %, Mo: 2 to 6 mass %, Ni: 0.5 to 6 mass %, V: 1 to 5 mass % and W: 0.5 to 5 mass %, with the balance being Fe and unavoidable impurities.

According to yet another aspect of the present invention, there is provided a member which comprises a steel material serving as a base metal, and a deposited metal build-up welded on a surface of the steel material, wherein the deposited metal contains C: 0.2 to 1.5 mass %, Si: 0.5 to 2 mass %, Mn: 0.5 to 2 mass %, Cr: 20 to 40 mass %, Mo: 2 to 6 mass %, Ni: 0.5 to 6 mass %, V: 1 to 5 mass % and W: 0.5 to 5 mass %, with the balance being Fe and unavoidable impurities.

Objects, features, aspects and advantages of the present invention will be apparent from the accompanying drawings and from the detailed description.

BRIEF DESCRIPTION OF THE DRAWINGS

FIG. 11 is photographs representing sectional microstructures of some of the deposited metals of the examples and comparative examples, as a substitute for drawings.

DESCRIPTION OF EMBODIMENTS

Figure 1:
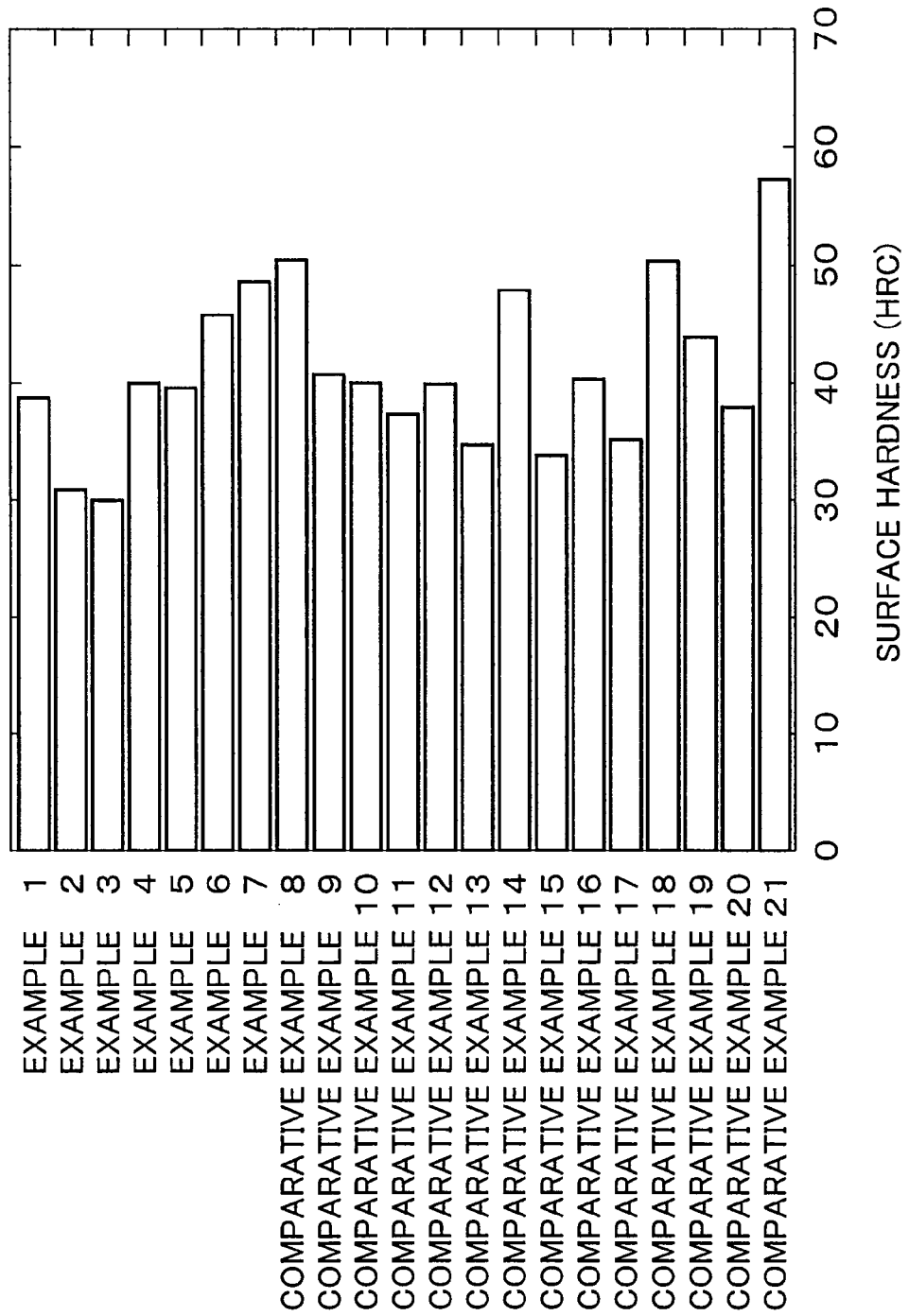
FIG. 1 is a diagram illustrating Rockwell hardnesses of deposited metals of examples and comparative examples.

With reference to the drawings, embodiments of the present invention will now be specifically described. It should be understood that the present invention is not limited to the embodiments in any way.

[Build-Up Welding Material and Deposited Metal]

A build-up welding material according to one embodiment of the first aspect of the present invention contains C: 0.2 to 1.5 mass %, Si: 0.5 to 2 mass %, Mn: 0.5 to 2 mass %, Cr: 20 to 40 mass %, Mo: 2 to 6 mass %, Ni: 0.5 to 6 mass %, V: 1 to 5 mass % and W: 0.5 to 5 mass %, with the balance being Fe and unavoidable impurities.

A deposited metal according to one embodiment of the second aspect of the present invention is a deposited metal produced by build-up welding. The deposited metal contains C: 0.2 to 1.5 mass %, Si: 0.5 to 2 mass %, Mn: 0.5 to 2 mass %, Cr: 20 to 40 mass %, Mo: 2 to 6 mass %, Ni: 0.5 to 6 mass %, V: 1 to 5 mass % and W: 0.5 to 5 mass %, with the balance being Fe and unavoidable impurities.

The deposited metal according to this embodiment is formed by build-up welding the build-up welding material according to this embodiment onto a base metal.

The base metal is not particularly limited, as long as it is a metal material capable of allowing a deposited material to be formed on a surface thereof by build-up welding. For example, a material for forming a container of a pulverizer, a reactor or the like includes various stainless steels, S25C steel, SC49 steel and SS400 steel.

Build-up welding conditions for forming the deposited metal according to this embodiment may be conventional build-up welding conditions. A deposited metal having an aftermentioned metal microstructure (where a matrix comprises a plurality of ferrite grains, and a plurality of cementite grains are precipitated from ferrite grain boundaries) can be obtained by performing build-up welding under conventional conditions using the build-up welding material according to this embodiment. In this regard, it is desirable to heat the base metal during the welding. More specifically, it is desirable to heat and cool the base metal at a temperature rising rate of 100 to 300° C./h, a holding temperature of 250 to 350° C. and a cooling rate of 15 to 100° C./h, and perform the welding under a condition that the base metal is isothermally held at a temperature of 250 to 350° C.

The reasons why the components of the build-up welding material and deposited metal according to the above embodiments are set as above will be described below.

C: 0.2 to 1.5 Mass %

C (Carbon) is an element which is effective in keeping a balance between tension strength and elongation in each of a deposited metal, and a weld metal comprising the deposited metal and a melted base metal. Further, C is an element which is effective in causing cementite ($Fe_3C$) to be precipitated in such a manner as to wrap around ferrite grains at grain boundaries in a ferrite matrix, during a cooling process after build-up welding. A C content (C amount) is equal to or less than 1.5 mass %. This is because, if the C amount is greater than 1.5 mass %, embrittlement occurs due to deterioration in toughness, so that, in the treatment container, a tendency toward an increase in aggressive abrasion becomes prominent. Preferably, it is equal to or less than 0.8 mass %. This is because, when the C amount is equal to or less than 0.8 mass %, a deposited metal is formed as eutectoid steel or hypoeutectoid steel, which provides increased toughness and allows easier working. At the same time, the C amount is equal to or greater than 0.2 mass %. This is because, if the C amount is less than 0.2 mass %, a thickness of a ferrite phase to be precipitated at the grain boundaries in the ferrite matrix becomes smaller, so that a tendency to become difficult in wrapping around ferrite grains, even partially, becomes prominent. Preferably, it is equal to or greater than 0.6 mass %. This is because an amount of other element to be added to ensure abrasion resistance can be reduced.

Si: 0.5 to 2 Mass %

Si (Silicon) is an element for enhancing tension strength in each of a deposited metal, and a weld metal comprising the deposited metal and a melted base metal. From the standpoint of allowing this function to be effectively exerted, a Si content (Si amount) is equal to or greater than 0.5 mass %. Preferably, it is equal to or greater than 0.7 mass %. At the same time, from the standpoint of suppressing the occurrence of red scale (red rust), the Si amount is equal to or less than 2 mass %. Preferably, it is equal to or less than 1.5 mass %. In the deposited metal according to the above embodiment, it is necessary to suppress the occurrence of red scale, for the following reason. Red scale consists mainly of $\alpha$-$Fe_2O_3$, and occurs in a state in which it is coated on a surface of a deposited metal in fine powder form and in a chalky state. Red scale is extremely brittle. Although red scale can be removed by pickling, a surface asperity in each of a deposited metal, and a weld metal comprising the deposited metal and a melted base metal, after the pickling, becomes larger, so that cracking is more likely to occur.

Mn: 0.5 to 2 Mass %

Mn (Manganese) is an element which is necessary for ensuring strength and toughness in each of a deposited metal, and a weld metal comprising the deposited metal and a melted base metal. From the standpoint of allowing this function to be effectively exerted, a Mn content (Mn amount) is equal to or greater than 0.5 mass %. Preferably, it is equal to or greater than 0.7 mass %. At the same time, from the standpoint of suppressing impairment of toughness and weldability, the Mn amount is equal to or less than 2 mass %. Preferably, it is equal to or less than 1.5 mass %.

Cr: 20 to 40 Mass %

Cr (Chromium) is an element which is essential for enhancing corrosion resistance in each of a deposited metal, and a weld metal comprising the deposited metal and a melted base metal. Further, Cr is an element for forming a carbide, and, more specifically, an element which has a function of causing a carbide to be finely precipitated and hardened in a ferrite crystal grain. Based on the precipitation hardening of the fine carbide, abrasion resistance is enhanced. A Cr content (Cr amount) is equal to or greater than 20 mass %. Preferably, it is equal to or greater than 24 mass %. This is because, if the Cr amount is less than 20 mass %, desired corrosion resistance and abrasion resistance (hardness) cannot be obtained. At the same time, the Cr amount is equal to or less than 40 mass %. Preferably, it is equal to or less than 36 mass %. This is because, if the Cr amount is greater than 40 mass %, martensite is more likely to be produced, which makes it more likely that hardness is increased, and toughness is deteriorated.

Mo: 2 to 6 Mass %

Mo (Molybdenum) is an element for enhancing corrosion resistance in each of a deposited metal, and a weld metal comprising the deposited metal and a melted base metal. From the standpoint of allowing this function to be effectively exerted, a Mo content (Mo amount) is equal to or greater than 2 mass %. Preferably, it is equal to or greater than 3.5 mass %. At the same time, from the standpoint of suppressing a situation where infiltration of Firelite, i.e., an oxide of Fe and Si ($Fe_2SiO_4$), is facilitated due to steel grain-boundary segregation of a molybdenum compound, the Mo amount is equal to or less than 6 mass %. Preferably, it is equal to or less than 4.5 mass %.

Ni: 0.5 to 6 Mass %

Ni (Nickel) is an element for enhancing corrosion resistance in each of a deposited metal, and a weld metal comprising the deposited metal and a melted base metal. From the standpoint of allowing this function to be effectively exerted, a Ni content (Ni amount) is equal to or greater than 0.5 mass %. Preferably, it is equal to or greater than 0.7 mass %. At the same time, from the standpoint of suppressing a situation where austenite is more likely to be produced, the Ni amount is equal to or less than 6 mass %. Preferably, it is equal to or less than 1.5 mass %.

V: 1 to 5 Mass %

V (Vanadium) is an element which has a function of forming and precipitation-hardening a vanadium carbide (VC) in a deposited metal. V is added to enhance abrasion resistance in each of a deposited metal, and a weld metal comprising the deposited metal and a melted base metal. From the standpoint of allowing this function to be effectively exerted, a V content (V amount) is equal to or greater than 1 mass %. Preferably, it is equal to or greater than 1.5 mass %. At the same time, from the standpoint of suppressing a situation where toughness is deteriorated due to precipitation of a vanadium carbide in a ferrite crystal grain, the V amount is equal to or less than 5 mass %. Preferably, it is equal to or less than 2.5 mass %.

W: 0.5 to 5 Mass %

W (Tungsten) is an element which has a function of forming and precipitation-hardening a tungsten carbide (VC) in a deposited metal. W is added to enhance abrasion resistance in each of a deposited metal, and a weld metal comprising the deposited metal and a melted base metal. From the standpoint of allowing this function to be effectively exerted, a W content is equal to or greater than 0.5 mass %. Preferably, it is equal to or greater than 0.7 mass %. At the same time, from the standpoint of suppressing a situation where toughness is deteriorated due to precipitation of a tungsten carbide in a ferrite crystal grain, the W amount is equal to or less than 5 mass %. Preferably, it is equal to or less than 1.5 mass %.

The deposited metal according to the above embodiment satisfies the above component composition, and the balance of the composition is Fe and unavoidable impurities. The unavoidable impurities include components, such as Al (aluminum) and Ca (calcium), to be unavoidably mixed in a welding material for use in build-up welding, during a production process of the welding material As other elements, the deposited metal according to the above embodiment may further contain (A) P: 0.03 mass % or less (except 0 mass %), and/or S: 0.02 mass % or less (except 0 mass %), and/or (B) total 15 mass % or less (except 0 mass %) of one or more selected from the group consisting of Ti, Co, Cu, Zr, Nb, Pd, Ag, Sn, Hf, Ta, Pt, Au and Pb. The reasons for defining these ranges are as follows.

P: 0.03 Mass % or Less

P (phosphorus) is an element which is segregatable as an impurity at grain boundaries in steel. When the steel material is stretched in a drawing direction by forging, rolling, etc., a segregated zone of P is formed. Ferrite ($\alpha$-Fe) is formed in the segregated zone, and C is excluded from the segregated zone. As a result, $\alpha$-Fe is formed zonally in the segregated zone of P, and pearlite is formed zonally in the remaining region. Such a segregated zone of P is generally called "ferrite band", and when the ferrite band is formed, ductility in a direction perpendicular to the zone is deteriorated. In the case where a steel material subjected to forging or rolling is used as a base metal, and a deposited metal is formed on a surface of the base metal by build-up welding using a welding material, a P content (P amount) is equal to or less than 0.03 mass %. This is because, if P in the deposited metal is greater than 0.03 mass %, a problem of deterioration in ductility due to the ferrite band. In other cases, the P amount may be greater than 0.03 mass %.

S: 0.02 Mass % or Less

S (sulfur) is an element for forming, in steel, MnS as a sulfide-based inclusion, which is segregated during hot working of the steel material, causing embrittlement of the steel material. In the case where a steel material subjected to forging or rolling is used as a base metal, and a deposited metal is formed on a surface of the base metal by build-up welding using a welding material, a S content (S amount) is equal to or less than 0.02 mass %. This is because, if S in the deposited metal is greater than 0.02 mass %, a steel material is embrittled, causing a problem that it is more likely to be cracked. In other cases, the S amount may be greater than 0.02 mass %.

Total 15 mass % or less of one or more selected from the group consisting of Ti, Co, Cu, Zr, Nb, Pd, Ag, Sn, Hf, Ta, Pt, Au and Pb A component capable of expressing an effect other than the effects of the present invention without impairing the deposited metal according to the above embodiment includes Ti (titanium), Co (cobalt), Cu (copper), Zr (zirconium), Nb (niobium), Pd (palladium), Ag (silver), Sn (tin), Hf (hafnium), Ta (tantalum), Pt (platinum), Au (gold) and Pb (lead). In order to express other effects in addition to the effects of the present invention, the deposited metal according to the above embodiment may contain one or more of the above elements in a total amount of 15 mass % or less. This is because, as long as the content of the above elements is not greater than 15 mass % in total, the deposited metal according to the above embodiment is maintained in a microstructure where a matrix comprises a plurality of ferrite grains, and a plurality of cementite grains are precipitated from ferrite grain boundaries, more specifically, in a polycrystalline microstructure where a ferrite phase as a matrix exhibits crystalline characteristics, and at least a part of the periphery of the ferrite crystal is covered by a cementite phase, so that it becomes possible to prevent deterioration in corrosion resistance, abrasion resistance and toughness.

Preferably, the deposited metal according to the above embodiment has a metal microstructure where a matrix comprises a plurality of ferrite grains, and a plurality of cementite grains are precipitated from ferrite grain boundaries. More preferably, the deposited metal according to the above embodiment has a ferrite microstructure as a matrix, wherein the ferrite microstructure has a structure where cementite wraps around the peripheries of ferrite grains. The reason is as follows.

A ferrite microstructure is capable of stably absorbing and storing hydrogen therein as compared to an austenite microstructure and a martensite microstructure, so that there is an advantageous effect that it is less likely to undergo hydrogen embrittlement and cracking even in an acidic atmosphere. That is, in the ferrite microstructure, even if hydrogen is generated due to corrosion and incorporated into a steel material, such hydrogen will not be locally accumulated in ferrite, so that excellent hydrogen embrittlement resistance is exhibited in an acidic atmosphere, as compared to an austenite microstructure and a martensite microstructure. Furthermore, the plurality of cementite grains precipitated in the ferrite grain boundaries keep connection between respective ones of the ferrite grains, more preferably, the cementite wraps around the ferrite, so that the ferrite microstructure is less likely to be cracked, as compared to an austenite microstructure and a martensite microstructure.

In this regard, a metal microstructure of the deposited metal disclosed in the Patent Document 1 is an acicular carbide microstructure. In the acicular carbide microstructure, hydrogen is likely to be accumulated in an interface between acicular carbide and ferrite, so that hydrogen-induced cracking is more likely to occur. Particularly, it is more likely to be cracked in one direction. In comparison with the acicular carbide microstructure, the above ferrite microstructure is low in residual stress and microstructurally stable, so that there is an advantage that it is less likely to be cracked.

As illustrated in the following Example, almost no compositional difference occurs between the build-up welding material and the deposited metal according to the above embodiments, except only that respective contents of Cr, Mo and Ni are slightly reduced. Thus, as the build-up welding material according to the above embodiment, a material having the same composition as that of the deposited metal according to the above embodiment, or a material having a composition in which respective contents of Cr, Mo and Ni are slightly greater than those of a target composition, may be prepared.

[Member with Deposited Metal]

A member with a deposited metal, according to one embodiment of the third aspect of the present invention, comprises a steel material serving as a base metal, and a deposited metal build-up welded on a surface of the steel material. This deposited metal is the deposited metal according to the above embodiment.

In the member according to this embodiment, the base metal and the deposited metal are joined through a heat-affected zone and a melted base metal.

The base metal is not particularly limited, as long as it is a steel material. In the case where the base metal is used as a material for forming a container of a pulverizer, a reactor or the like, it includes, for example, various stainless steels, S25C steel, SC49 steel and SS400 steel, as mentioned above. Among these steel materials, in view of suppressing dilution of the base metal, it is preferable to use, as the base metal, a steel material having the same composition as that of the deposited metal according to the above embodiment. However, the base metal primarily requires strength and toughness, whereas the deposited metal primarily requires hardness and abrasion resistance. Therefore, it is actually difficult to employ, as the base metal, a steel material having the same component composition as that of the deposited metal. For this reason, it is desirable to sequentially perform build-up welding onto a material (deposited metal) build-up welded as much as possible, while positioning the base metal in a vertical posture. This makes it possible to suppress, to a certain extent, interdiffusion of component elements (primarily, Fe) between the melted base metal and the deposited metal, due to gravitational force and convection.

The member according to this embodiment can be suitably used as a processing container installed in a processing apparatus, such as a pulverizer or a reactor, for treating a target substance comprising an acid such as hydrochloric acid or sulfuric acid, under an acidic corrosive environment having pH=about 7.0 to about 4.2 and in a temperature range of room temperature to about 200° C. The deposited metal according to the above embodiment may be formed on an inner wall of the processing container by build-up welding, thereby making it possible to enhance corrosion resistance and abrasion resistance of the processing container and thus extend usable life thereof.

Although the present invention will be more specifically described below based on Example, it should be understood that the following Example is not intended to restrict a technical scope of the present invention, but may be implemented with appropriate changes and modifications made to an extent capable of conforming to the above and following contents. Therefore, such changes and modifications should be construed as being included in the technical scope of the present invention.

EXAMPLE

The following description will be made about inventive and comparative examples for demonstrating the effects of the present invention.

The following Table 1 illustrates respective compositions of various welding materials. It is noted that the balance in each of the welding materials comprises unavoidable impurities in addition to Fe or Co described in Table 1.

TABLE 1

| | | COMPOSITION (MASS %) | | | | | | | | | | |
|---|---|---|---|---|---|---|---|---|---|---|---|---|
| | | C | Si | Mn | P | S | Cr | Mo | Ni | V | W | BALANCE |
| EXAMPLE | 1 | 0.6 | 1.2 | 1.0 | <0.03 | <0.02 | 35.0 | 4.0 | 1.0 | 2.0 | 1.0 | Fe |
| | 2 | 0.4 | 1.2 | 1.0 | <0.03 | <0.02 | 35.0 | 4.0 | 1.0 | 2.0 | 1.0 | Fe |
| | 3 | 0.25 | 1.2 | 1.0 | <0.03 | <0.02 | 35.0 | 4.0 | 1.0 | 2.0 | 1.0 | Fe |
| | 4 | 0.6 | 2.0 | 1.0 | <0.03 | <0.02 | 35.0 | 4.0 | 1.0 | 2.0 | 1.0 | Fe |
| | 5 | 0.6 | 1.2 | 1.0 | <0.03 | <0.02 | 35.0 | 4.0 | 2.0 | 4.0 | 2.0 | Fe |
| | 6 | 1.2 | 1.2 | 1.0 | <0.03 | <0.02 | 35.0 | 4.0 | 1.0 | 2.0 | 1.0 | Fe |
| | 7 | 1.5 | 1.2 | 1.0 | <0.03 | <0.02 | 35.0 | 4.0 | 1.0 | 2.0 | 1.0 | Fe |
| COMPARATIVE EXAMPLE | 8 | 1.8 | 1.2 | 1.0 | <0.03 | <0.02 | 35.0 | 4.0 | 1.0 | 2.0 | 1.0 | Fe |
| | 9 | 0.6 | 3.0 | 1.0 | <0.03 | <0.02 | 35.0 | 4.0 | 1.0 | 2.0 | 1.0 | Fe |
| | 10 | 0.6 | 2.5 | 1.0 | <0.03 | <0.02 | 35.0 | 4.0 | 1.0 | 2.0 | 1.0 | Fe |
| | 11 | 0.6 | 0.3 | 1.0 | <0.03 | <0.02 | 35.0 | 4.0 | 1.0 | 2.0 | 1.0 | Fe |
| | 12 | 0.6 | 1.2 | 3.0 | <0.03 | <0.02 | 35.0 | 4.0 | 1.0 | 2.0 | 1.0 | Fe |
| | 13 | 0.6 | 1.2 | 0.2 | <0.03 | <0.02 | 35.0 | 4.0 | 1.0 | 2.0 | 1.0 | Fe |
| | 14 | 0.6 | 1.2 | 1.0 | <0.03 | <0.02 | 50.0 | 4.0 | 1.0 | 2.0 | 1.0 | Fe |
| | 15 | 0.6 | 1.2 | 1.0 | <0.03 | <0.02 | 19.0 | 4.0 | 1.0 | 2.0 | 1.0 | Fe |
| | 16 | 0.6 | 1.2 | 1.0 | <0.03 | <0.02 | 35.0 | 10.0 | 1.0 | 2.0 | 1.0 | Fe |
| | 17 | 0.6 | 1.2 | 1.0 | <0.03 | <0.02 | 35.0 | 1.0 | 1.0 | 2.0 | 1.0 | Fe |
| | 18 | 2.5 | — | — | <0.03 | <0.02 | 33.0 | — | — | — | 13.0 | Co |
| | 19 | 1.0 | — | — | <0.03 | <0.02 | 26.0 | — | — | — | 5.0 | Co |
| | 20 | 0.4 | 0.2 | 0.6 | <0.03 | <0.02 | 13.0 | 0.3 | — | — | — | Fe |
| | 21 | 4.5 | 0.7 | 1.1 | <0.03 | <0.02 | 31.0 | 1.6 | — | — | — | Fe |

The following Table 2 illustrates the chemical component standard of carbon steel for machine structural use (S25C steel) used as a base metal, i.e., a welding target. It is noted that the balance of the S25C steel comprises unavoidable impurities in addition to Fe described in Table 2.

TABLE 2

| MATERIAL | COMPOSITION (MASS %) | | | | | |
| --- | --- | --- | --- | --- | --- | --- |
| | C | Si | Mn | P | S | BALANCE |
| S25C | 0.20~0.30 | 0.15~0.40 | 0.30~0.60 | <0.045 | <0.045 | Fe |

Welding conditions are as follows. Each of the welding materials illustrated in Table 1 was used for build-up welding the welding material onto a surface of a base metal consisting of S25C steel, to form a build-up welded layer (build-up weld metal) having an average thickness of about 3 mm. In advance of the welding, the base metal was heated from room temperature to 300° C. at temperature rising rate of 100° C./h. Then, the build-up welding was performed under a condition that the base metal is isothermally held at 300° C. After completion of the welding, the base metal was cooled to room temperature at a cooling rate of 20° C./h. The build-up welding was performed in a flat position at a welding current of 280 A and a welding voltage of 30 V, and a heat input during the welding was 2.0 kJ/mm.

The following Table 3 illustrates a composition of a surface layer (deposited metal) in each of the build-up weld metals obtained by the welding. It is noted that the balance in each surface layer comprises unavoidable impurities in addition to Fe or Co described in Table 3. The surface layer means a region having a depth of 1 mm or less from the surface. A region of the build-up weld metal having a depth of 1 mm was mechanically scraped from the surface layer. Then, the scraped portion was dissolved in a given acid and quantitatively analyzed by chemical analysis, and a result of the analysis was determined as a component composition of the deposited metal. In the chemical analysis, C (carbon) and Si were quantitatively analyzed, respectively, by an infrared absorption method, and the remaining elements were quantitatively analyzed by ICP atomic emission spectrophotometry. The following Table 3 is a quantitative analysis result for the deposited metals determined in this manner.

TABLE 3

| | | COMPOSITION (MASS %) | | | | | | | | | | |
| --- | --- | --- | --- | --- | --- | --- | --- | --- | --- | --- | --- | --- |
| | | C | Si | Mn | P | S | Cr | Mo | Ni | V | W | BALANCE |
| EXAMPLE | 1 | 0.58 | 1.15 | 1.03 | <0.03 | <0.02 | 28.47 | 3.23 | 0.89 | 1.76 | 0.93 | Fe |
| | 2 | 0.32 | 1.18 | 1.04 | <0.03 | <0.02 | 28.01 | 3.22 | 0.86 | 1.91 | 0.82 | Fe |
| | 3 | 0.23 | 1.17 | 0.98 | <0.03 | <0.02 | 28.06 | 3.00 | 0.78 | 1.84 | 0.91 | Fe |
| | 4 | 0.61 | 1.95 | 1.05 | <0.03 | <0.02 | 27.99 | 3.16 | 0.84 | 1.89 | 0.97 | Fe |
| | 5 | 0.63 | 0.99 | 0.80 | <0.03 | <0.02 | 28.00 | 3.30 | 1.70 | 3.70 | 2.02 | Fe |
| | 6 | 1.15 | 1.13 | 0.95 | <0.03 | <0.02 | 27.97 | 3.27 | 0.88 | 1.82 | 1.03 | Fe |
| | 7 | 1.31 | 1.08 | 1.01 | <0.03 | <0.02 | 27.98 | 3.15 | 0.82 | 1.85 | 1.02 | Fe |
| COMPARATIVE | 8 | 1.56 | 1.04 | 1.03 | <0.03 | <0.02 | 28.12 | 3.18 | 0.79 | 1.88 | 1.00 | Fe |
| EXAMPLE | 9 | 0.58 | 2.89 | 1.01 | <0.03 | <0.02 | 26.77 | 3.24 | 0.81 | 1.77 | 0.95 | Fe |
| | 10 | 0.60 | 2.41 | 1.02 | <0.03 | <0.02 | 25.97 | 3.26 | 0.87 | 1.87 | 0.99 | Fe |
| | 11 | 0.63 | 0.27 | 1.02 | <0.03 | <0.02 | 28.02 | 3.06 | 0.89 | 1.97 | 1.01 | Fe |
| | 12 | 0.59 | 1.13 | 2.90 | <0.03 | <0.02 | 28.04 | 3.21 | 0.91 | 1.91 | 1.04 | Fe |
| | 13 | 0.58 | 1.18 | 0.28 | <0.03 | <0.02 | 28.01 | 3.07 | 0.87 | 1.78 | 1.00 | Fe |
| | 14 | 0.58 | 1.12 | 1.03 | <0.03 | <0.02 | 41.23 | 3.12 | 0.86 | 1.76 | 0.98 | Fe |
| | 15 | 0.61 | 1.11 | 1.01 | <0.03 | <0.02 | 16.04 | 3.05 | 0.89 | 1.77 | 0.97 | Fe |
| | 16 | 0.60 | 1.09 | 1.03 | <0.03 | <0.02 | 27.93 | 8.32 | 0.84 | 1.91 | 1.03 | Fe |
| | 17 | 0.63 | 1.12 | 1.02 | <0.03 | <0.02 | 27.96 | 0.87 | 0.94 | 1.84 | 0.89 | Fe |
| | 18 | 2.18 | — | — | <0.03 | <0.02 | 21.83 | — | — | — | 9.21 | Co |
| | 19 | 1.16 | — | — | <0.03 | <0.02 | 29.99 | — | — | — | 4.53 | Co |
| | 20 | 0.37 | 0.22 | 0.59 | <0.03 | <0.02 | 12.13 | 0.27 | — | — | — | Fe |
| | 21 | 3.64 | 0.87 | 1.05 | <0.03 | <0.02 | 27.03 | 0.70 | — | — | — | Fe |

All of the welding materials of Examples 1 to 7 and Comparative Examples 8 to 17, 20 and 21 are Fe alloys. It is observed that, in the deposited metal, a concentration (content) of each of Cr, Mo and Ni tends to slightly decrease, as compared to the welding material (raw material). It is considered that this is because Fe as a primary constituent element of the base metal is dispersed in the build-up weld metal during the welding, to dilute the concentration of each of Cr, Mo and Ni. An amount of the decrease in concentration of each of Cr, Mo and Ni is about 20%. On the other hand, as to each of the remaining elements (C, Si, Mn, P, S, V and W) other than Cr, Mo and Ni, the deposited metal is maintained approximately at the same concentration as that in the welding material (raw material).

Although both of the welding materials of Comparative Examples 18 and 19 are Co alloys, Fe was detected as an alloy component. More specifically, Fe is originally not contained in each of the welding materials of Comparative Examples 18 and 19. However, due to dispersion of Fe from the base metal, Fe was mixed in them, respectively, at 9.57% and 7.98%, although not described in Table 3. As a result, particularly in Comparative Example 18, although a decrease in concentration of each of Cr and W is observed, an amount of the decrease in concentration of each of Cr and W is about 30%, which is not all that large. Further, as to each of some elements (C, P, S) other than Cr and W, the deposited metal is maintained approximately at the same concentration as that in the welding material (raw material). In Comparative Example 19, no large change in concentration of each of the contained elements is observed, so that a difference between respective compositions of the welding material and the deposited metal is small. Both of the welding materials of Comparative Examples 20 and 21 are Fe alloys. In this case, a decrease in concentration of each of Cr and Mo is observed. However, a level of the decrease is small. Further, as to each of some elements (C, Si, Mn, P and S) other than Cr Mo, the deposited metal is maintained approximately at the same concentration as that in the welding material (raw material). From the above results, it can be said that a difference between respective compositions of the welding material and the deposited metal is small.

A result obtained by subjecting each of the deposited metals illustrated in Table 3 to a measurement on surface hardness will be described below. As the surface hardness, Rockwell hardness and Vickers hardness were measured. More specifically, based on the Rockwell test specified in JIS G 0202, a circular cone (tip: 0.3 mm) having an apex angle of 120 degrees was pressed from the side of a build-up weld metal surface (deposited metal surface) with a load of 60 kgf, and a depth of a permanent dent from a reference surface was read after the load is returned to a reference load of 10 kgf. Then, the Rockwell hardness was derived using a Rockwell hardness calculation formula. In calculation of the Rockwell hardness, the C scale was used. The Vickers hardness was measured using an MVK-E Vickers hardness tester produced by Akashi Corp. More specifically, a pyramid-shaped indenter composed of a quadrilateral diamond in which an angle α between the opposite faces is 136 degrees was pressed against the build-up weld metal surface (deposited metal surface), and a surface area S (mm$^2$) of a dent remaining after removing a load was calculated from a length d (mm) of a diagonal line of the dent. Then, the Vickers hardness was calculated based on a relationship between the test load and the surface area, using a given calculation formula.

FIG. 1 illustrates respective Rockwell hardnesses of the deposited metals. Comparative Examples 18 and 21 having a high concentration of W or C exhibit a high hardness. In contrast, a hardness of each of the deposited metals of Examples 1 to 7 is equal to or greater than 30 in terms of Rockwell hardness, which satisfies an acceptance criterion value (Rockwell hardness of 30 or more), although it is low as compared to Comparative Examples 18 and 21. Thus, they are at a satisfactory level as a deposited metal.

Figure 2:
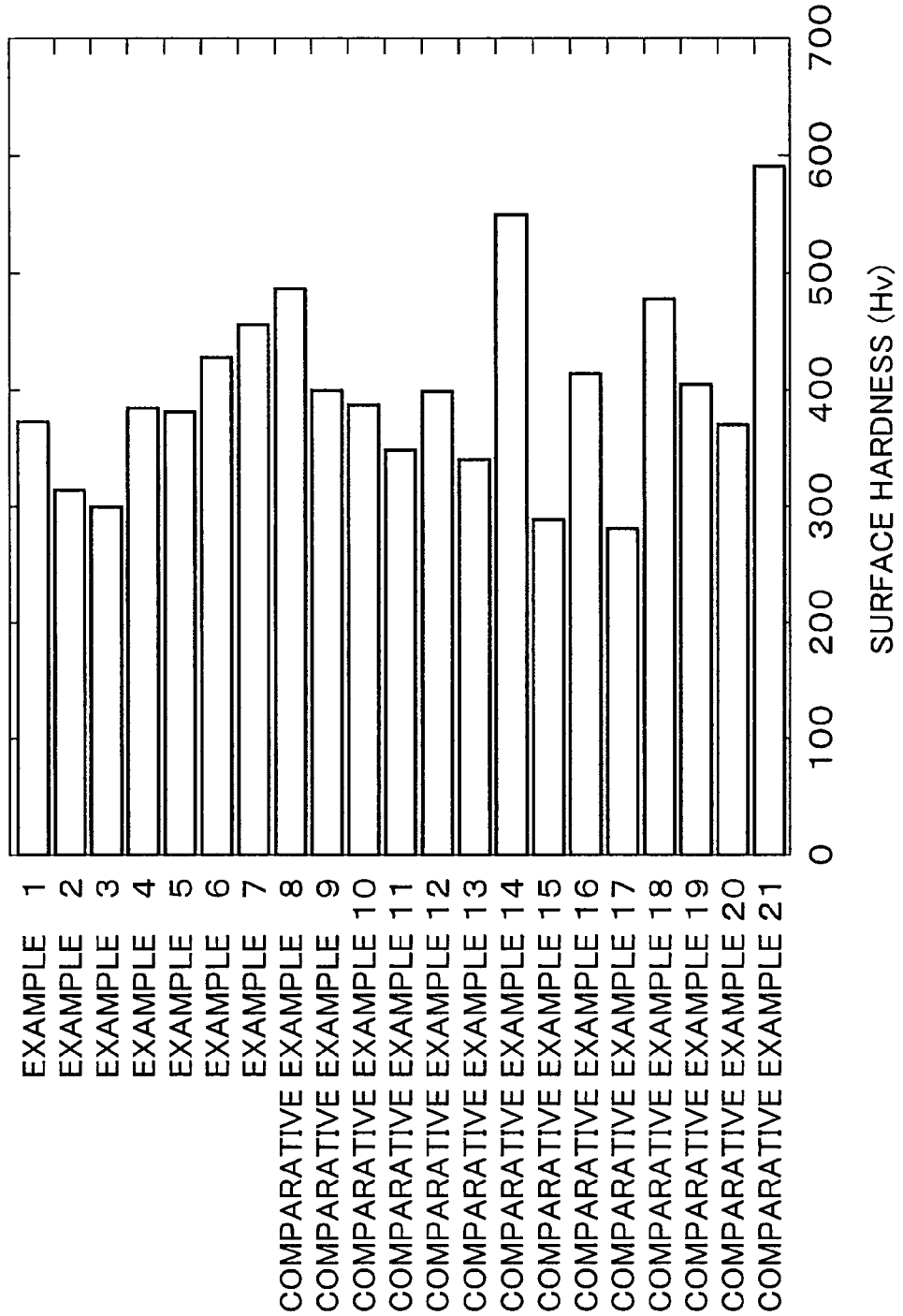
FIG. 2 is a diagram illustrating Vickers hardnesses of the deposited metals of the examples and comparative examples.

FIG. 2 illustrates respective Vickers hardnesses of the deposited metals. Comparative Examples 18 and 21 having a high concentration of W or C exhibit a high hardness. In contrast, a hardness of each of the deposited metals of Examples 1 to 7 is equal to or greater than 300 in terms of Vickers hardness, which satisfies an acceptance criterion value (Vickers hardness of 300 to 500), although it is low as compared to Comparative Examples 18 and 21. Thus, they are at a satisfactory level as a deposited metal. In this regard, an upper limit value is set as the acceptance criterion value of Vickers hardness, because Vickers hardness and toughness have a trade-off relationship. It can be said that Examples 1 to 5 are high in toughness, as compared to Comparative Examples 18 and 21.

Figure 3:
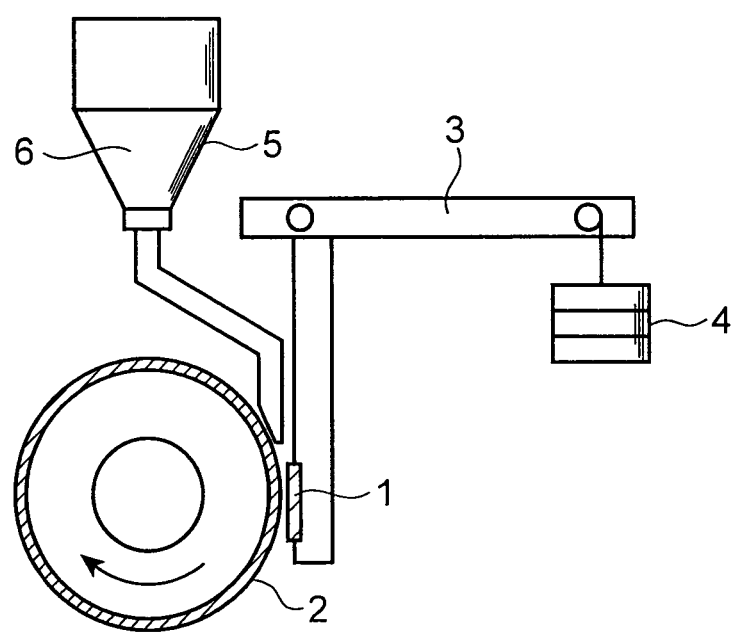
FIG. 3 is a conceptual diagram illustrating a principle of a soil abrasion test.

A result obtained by subjecting each of the build-up weld metals (deposited metals) illustrated in Table 3 to a test for evaluating abrasion resistance will be described below. The abrasion resistance was evaluated by the soil abrasion test specified in ASTM G 65. FIG. 3 is a conceptual diagram illustrating a soil abrasion test apparatus. As illustrated in FIG. 3, a rubber-coated rotary drum 2 is set in slidable contact with a test piece 1, and silica sand 6 is supplied from a hopper 5 to a position between the test piece 1 and the rubber-coated rotary drum 2. A pressing force of the test piece 1 against the rubber-coated rotary drum 2 is given by a lever arm 3 having a weight 4 hung from a free end thereof. Abrasion resistance of each of the deposited metals was evaluated by pressing a surface layer (deposited metal) of the test piece 1 consisting of a build-up weld metal, against the rubber-coated rotary drum 2 with a load of 13.3 kgf, and rotating the drum 2 for a predetermined number of rotations (6000 rotations) to measure respective abrasion weight losses of the test piece 1 after 2000 rotations, after 4000 rotations, and after completion of the test (after 6000 rotations).

Figure 4:
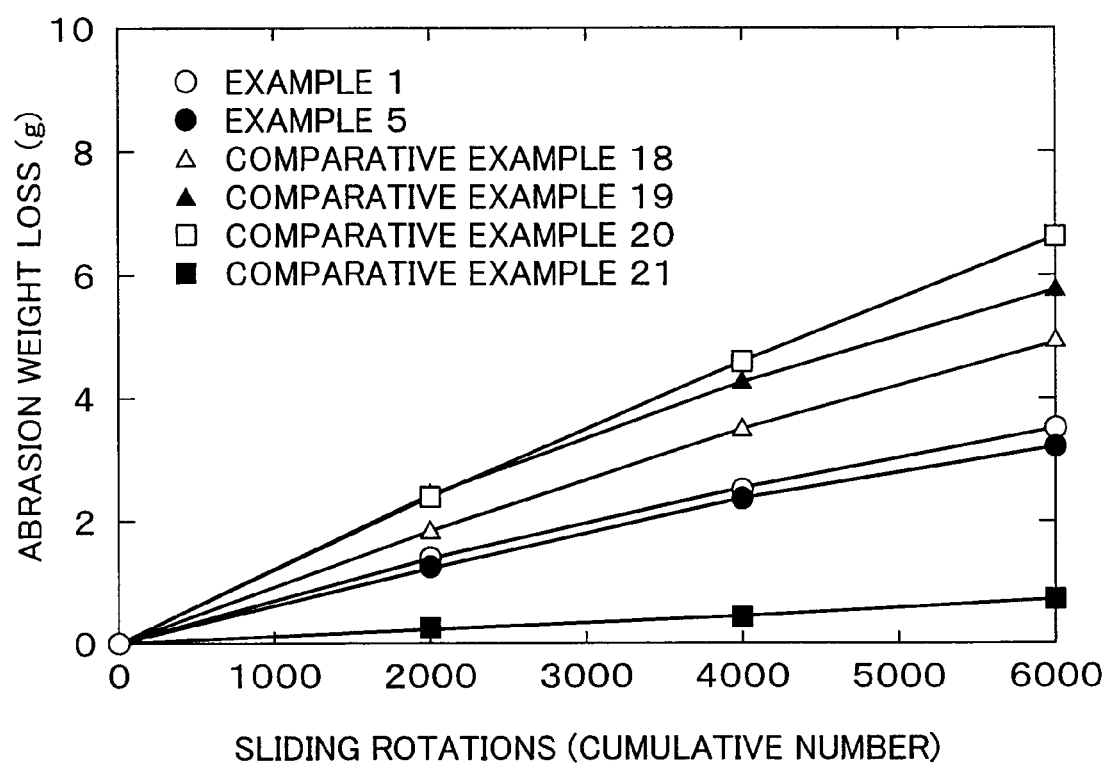
FIG. 4 is a graph illustrating a result of abrasion resistance (abrasion weight loss) evaluation for some of the deposited metals of the examples and comparative examples.
Figure 5:
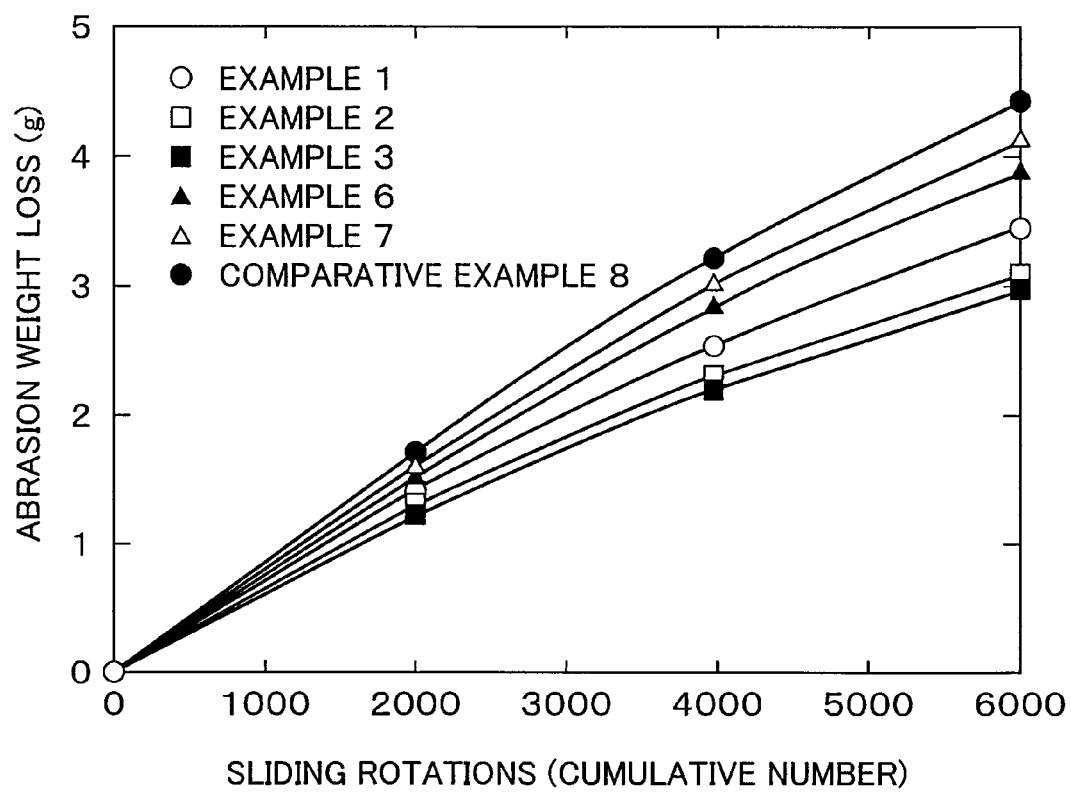
FIG. 5 is a graph illustrating a result of abrasion resistance (abrasion weight loss) evaluation for some of the deposited metals of the examples and comparative examples.
Figure 6:
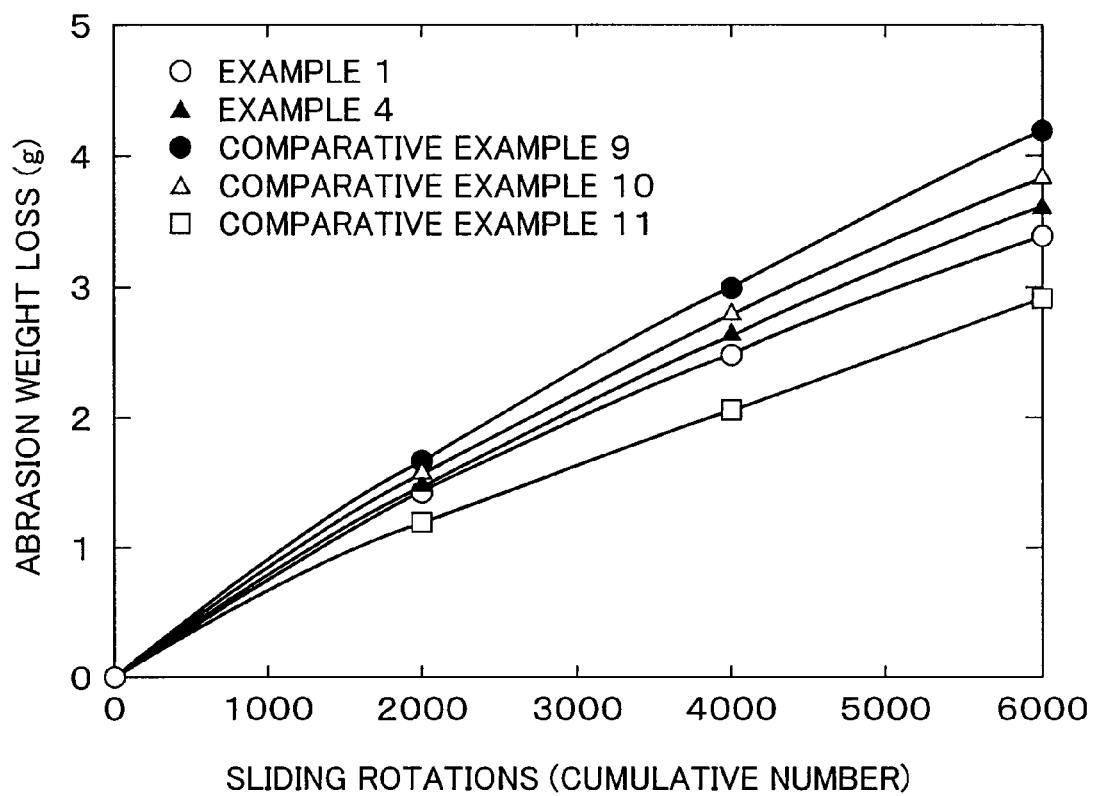
FIG. 6 is a graph illustrating a result of abrasion resistance (abrasion weight loss) evaluation for some of the deposited metals of the examples and comparative examples.

FIGS. 4 to 6 illustrate results of abrasion resistance evaluation for the deposited metals, wherein the horizontal axis represents the number of sliding rotations of the drum 2, and the vertical axis represents an abrasion weight loss. As illustrated in FIG. 4, among the deposited metals, Comparative Example 21 exhibited the highest abrasion resistance. Specifically, an abrasion weight loss of the test piece 1 after rotating the drum 2 for 6000 rotations was 1 g or less. On the other hand, as illustrated in FIGS. 4 to 6, an abrasion weight loss in each of Examples 1 to 5 exhibited the second-highest abrasion resistance just behind Comparative Example 21. Specifically, an abrasion weight loss after rotating the drum 2 for 6000 rotations was 4 g or less. Compared with them, as illustrated in FIG. 4, Comparative Examples 18 to 20 were evaluated that they are inferior in abrasion resistance. Specifically, a weight loss of the test piece after rotating the drum 2 for 6000 rotations was 5 g or more.

FIG. 5 is a graph for comparing respective abrasion weight losses in Examples 1 to 3, 6 and 7 and Comparative Example 8 in which only the C concentration (C content) is changed. As illustrated in FIG. 5, a result was obtained that the abrasion resistance becomes more deteriorated (the abrasion weight loss is increased) as the C concentration becomes higher. It is considered that this is because toughness becomes more deteriorated as the C concentration becomes higher, which accelerates embrittlement, causing an increase in aggressive abrasion.

FIG. 6 is a graph for comparing respective abrasion weight losses in Examples 1 and 4 and Comparative Examples 9 to 11 in which only the Si concentration (Si content) is changed. As illustrated in FIG. 6, a result was obtained that the abrasion resistance becomes more deteriorated (the abrasion weight loss is increased) as the Si concentration becomes higher. It is considered that this is because toughness becomes more deteriorated as the Si concentration becomes higher, which accelerates embrittlement, causing an increase in aggressive abrasion, as in the case of the C concentration. Although Comparative Examples 11 and 21 has an abrasion weight loss less than those in Examples 1 to 7, Comparative Example 11 is unsuitable for practical use due to an excessive low content of Si, and Comparative Example 12 is unsuitable for practical use due to an excessive large content of C.

Then, each of the build-up weld metals (deposited metals) illustrated in Table 3 was subjected to the following corrosion test to evaluate corrosion resistance thereof. A procedure of the corrosion test is as follows. Firstly, a test piece (coupon) having a size of 15×15×1.5 mm was taken from the side of the surface layer of each of the build-up weld metals, and used as a sample. Then, an aqueous solution (mixed-acid aqueous solution) obtained by mixing hydrochloric acid (HCl) and sulfuric acid ($H_2SO_4$) together in such a manner as to set a molar concentration ratio of HCl to $H_2SO_4$ to 2:1 was diluted with ion-exchanged water while adjusting pH to 2.0, to prepare a test solution, and each of the samples was immersed in the test solution maintained at 80° C., for 24 hours. Subsequently, a corrosion weight loss after the test was measured. The corrosion resistance was evaluated based on a level of the corrosion weight loss.

Figure 7:
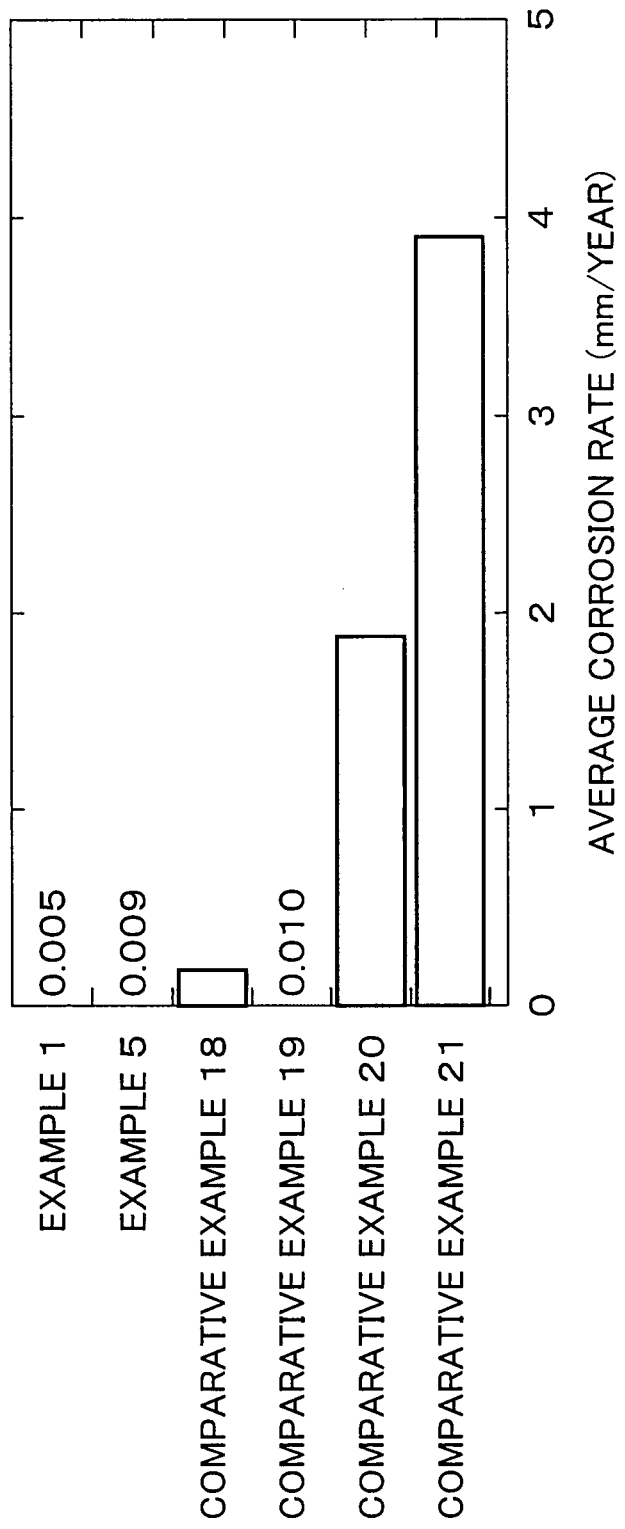
FIG. 7 is a graph illustrating a result of corrosion resistance (average corrosion rate) evaluation for some of the deposited metals of the examples and comparative examples.
Figure 8:
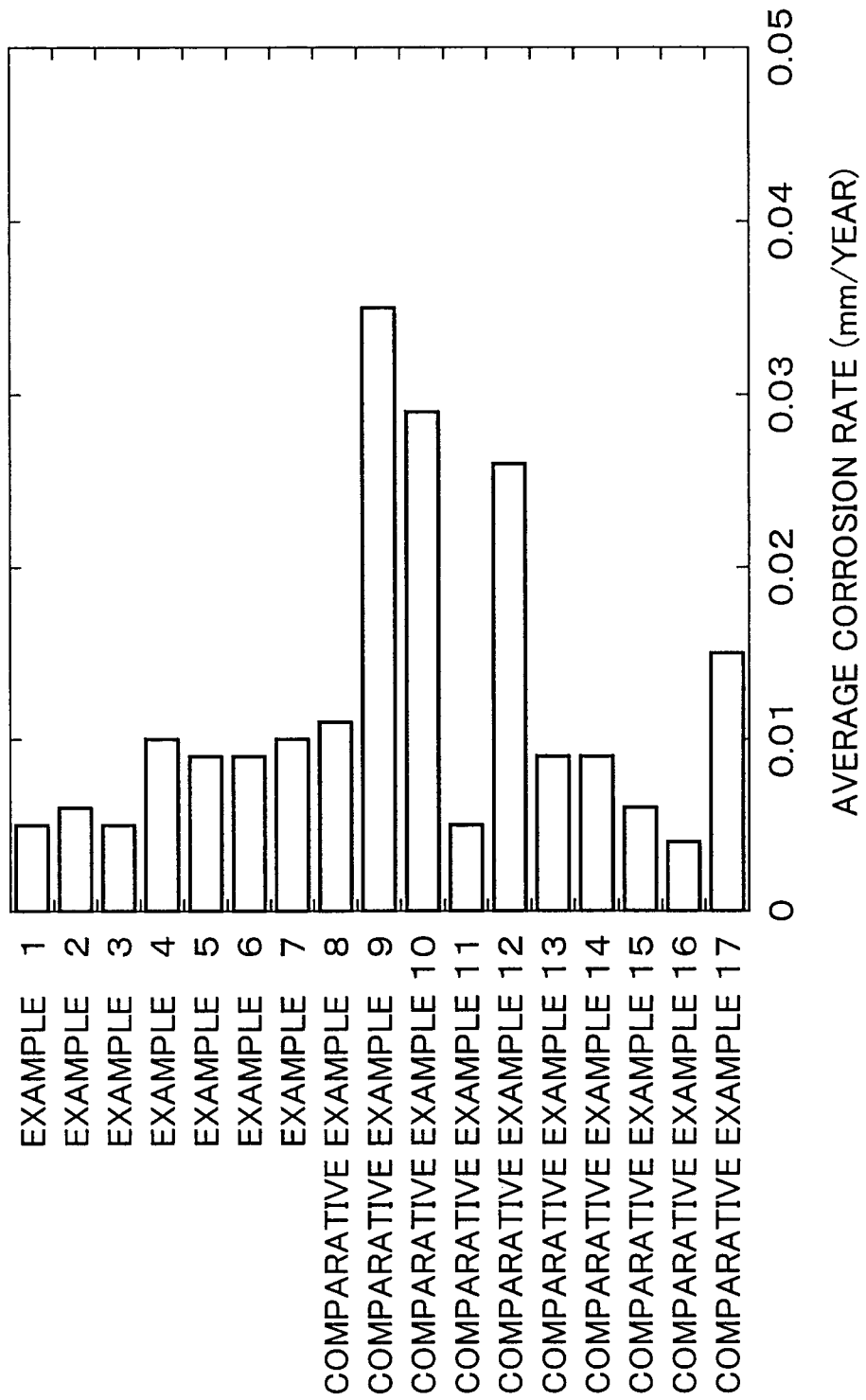
FIG. 8 is a graph illustrating a result of corrosion resistance (average corrosion rate) evaluation for some of the deposited metals of the examples and comparative examples.

FIGS. 7 and 8 illustrate a result of the corrosion test for the deposited metals (it is noted that a scale of the horizontal axis is different between FIGS. 7 and 8). The corrosion test was carried out under the condition that n=3, and an average corrosion rate was obtained from corrosion weight losses of the three samples. As illustrated in FIG. 7, each of Comparative Examples 20 and 21 has an extremely large average corrosion rate, and Comparative Example 18 has a relatively large average corrosion rate, which shows that they are inferior to other samples (Examples 1 and 5 and Comparative Example 19) in terms of the corrosion resistance. Further, as illustrated in FIG. 8, in Examples 1 to 7 and Comparative Examples 8 to 17, the samples of Comparative Examples 9 and 10 each having a high Si concentration (Si content), the sample of Comparative Example 12 having a high Mn concentration (Mn content), and the sample of Comparative Example 17 having a low Mo concentration (Mo content), have a relatively high average corrosion rate. Compared with them, each of the samples of Examples 1 to 7 has an average corrosion rate of 0.01 mm/year or less, which satisfies an acceptance criterion value (average corrosion rate of 0.01 mm/year or less). That is, they exhibit excellent corrosion resistance.

The above results are collectively illustrated in the following Table 4. The following Table 4 illustrates Rockwell hardnesses, Vickers hardnesses and average corrosion rates of inventive and comparative examples. In Table 4, a sample having a Rockwell hardness HRc of 30 or more (acceptance) is indicated by "good", and a sample having a Rockwell hardness HRc of less than 30 (non-acceptance) is indicated by "poor". Further, a sample having a Vickers hardness of 300 to 500 (acceptance) is indicated by "good", and a sample having a Vickers hardness out of the range (non-acceptance) is indicated by "poor". As illustrated in Table 4, Examples 1 to 7 are appropriate in terms of Rockwell hardness and Vickers hardness (both were evaluated as "good"), and low in average corrosion rate. Compared with them, Comparative Examples 8 to 10, 12, 17, 18, 20 and 21 are excessively high in average corrosion rate, and inferior in corrosion resistance. Further, Comparative Examples 15 and 17 are excessively low in Vickers hardness, and Comparative Examples 14 and 21 are excessively high in Vickers hardness.

TABLE 4

|  |  | ROCKWELL HARDNESS (HRc) | VICKERS HARDNESS (Hv) | AVERAGE CORROSION RATE (mm/YEAR) |
|---|---|---|---|---|
| EXAMPLE | 1 | GOOD | GOOD | 0.005 |
|  | 2 | GOOD | GOOD | 0.006 |
|  | 3 | GOOD | GOOD | 0.005 |
|  | 4 | GOOD | GOOD | 0.010 |

TABLE 4-continued

|  |  | ROCKWELL HARDNESS (HRc) | VICKERS HARDNESS (Hv) | AVERAGE CORROSION RATE (mm/YEAR) |
|---|---|---|---|---|
|  | 5 | GOOD | GOOD | 0.009 |
|  | 6 | GOOD | GOOD | 0.009 |
|  | 7 | GOOD | GOOD | 0.010 |
| COMPARATIVE | 8 | GOOD | GOOD | 0.011 |
| EXAMPLE | 9 | GOOD | GOOD | 0.035 |
|  | 10 | GOOD | GOOD | 0.029 |
|  | 11 | GOOD | GOOD | 0.005 |
|  | 12 | GOOD | GOOD | 0.026 |
|  | 13 | GOOD | GOOD | 0.009 |
|  | 14 | GOOD | POOR | 0.009 |
|  | 15 | GOOD | POOR | 0.006 |
|  | 16 | GOOD | GOOD | 0.004 |
|  | 17 | GOOD | POOR | 0.015 |
|  | 18 | GOOD | GOOD | 0.2 |
|  | 19 | GOOD | GOOD | 0.010 |
|  | 20 | GOOD | GOOD | 1.9 |
|  | 21 | GOOD | POOR | 3.9 |

Figure 9:
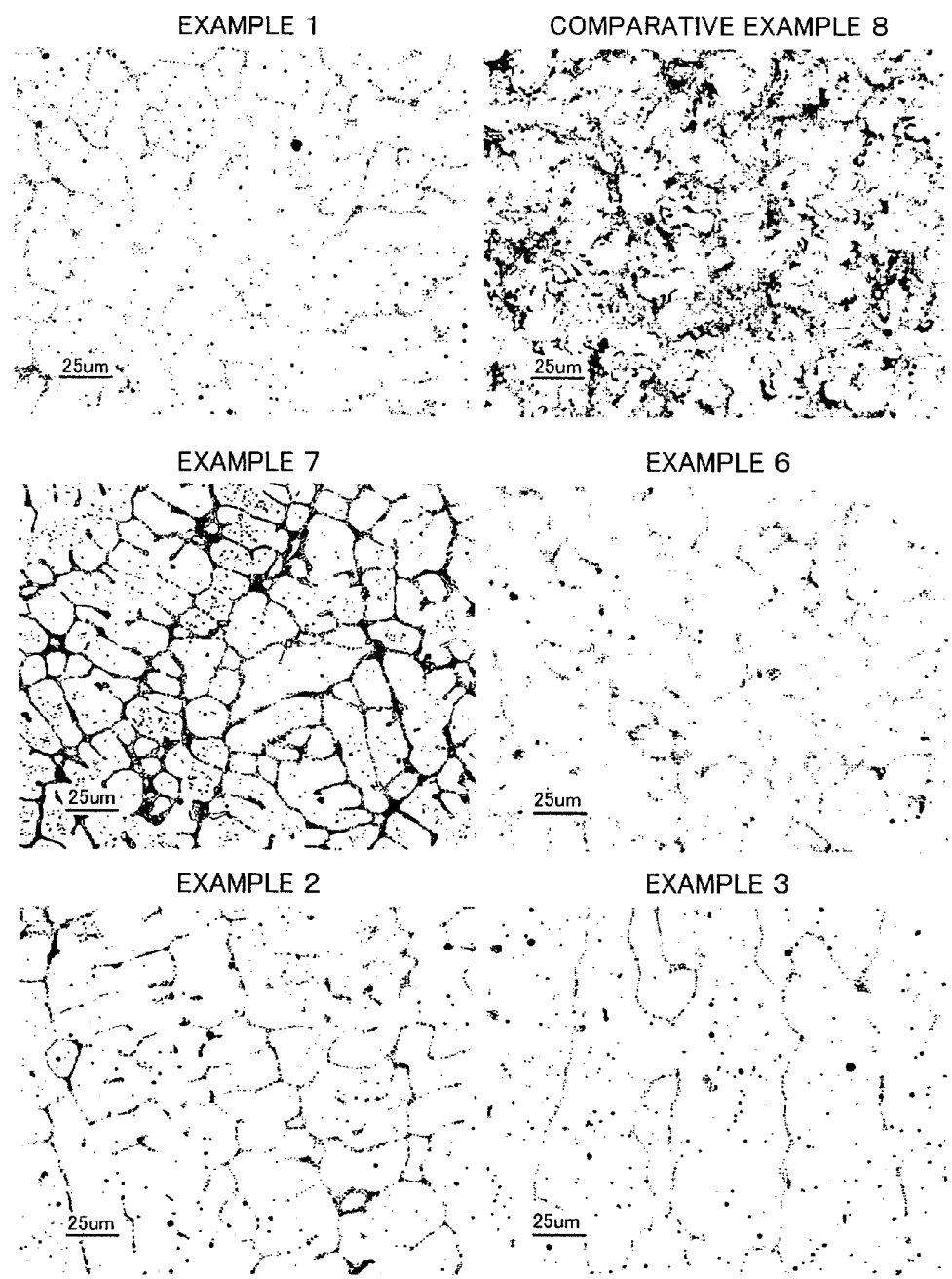
FIG. 9 is photographs representing sectional microstructures of some of the deposited metals of the examples and comparative examples, as a substitute for drawings.
Figure 10:
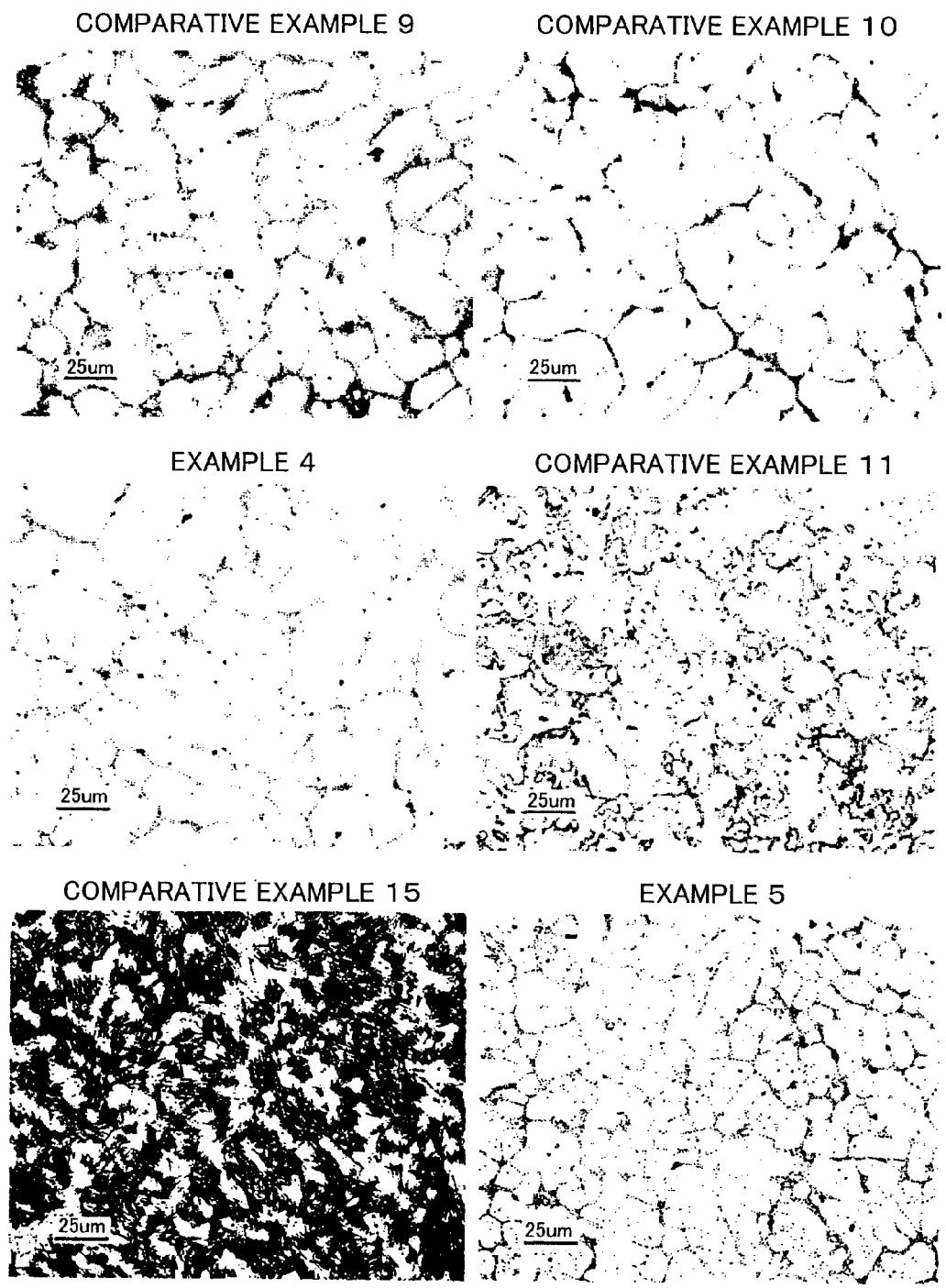
FIG. 10 is photographs representing sectional microstructures of some of the deposited metals of the examples and comparative examples, as a substitute for drawings.

A result of microscopic observation for a cross-sectional microstructure of each of the build-up weld metals (deposited metals) illustrated in Table 3 will be described below. A build-up weld metal layer was formed on a base metal made of S25C steel to have an average thickness of about 3 mm, and a test piece was cut out by machining in such a manner that the base metal is partially joined to the build-up weld metal layer. Then, the test piece was buried in resin, and the obtained resin block was polished to prepare a sample having an exposed cross-section of the build-up weld metal layer. After subjecting the sample to etching using aqua regia, a thicknesswise central portion of the build-up weld metal (deposited metal) was observed by an optical microscope at 400-fold magnification. FIGS. 9 to 11 are optical micrographs indicating respective cross-sectional microstructures of the deposited metals.

Example 1 has a polycrystalline microstructure in which a crystal grain size is in the range of 20 to 40 µm, and a matrix is a ferrite phase. Carbide ($Fe_3C$: cementite) is observed in crystal grain boundaries of the polycrystalline microstructure, and it can be ascertained that the carbide exists in such a manner that it wraps around ferrite crystal grains. In Examples 6 and 7 and Comparative Example 8 in which the C concentration is increased with respect to that in Example 1, a change in polycrystalline microstructure is observed along with an increase in C concentration. Specifically, a thickness of a carbide ($Fe_3C$: cementite) layer to be precipitated in the crystal grain boundaries becomes larger along with an increase in C concentration. However, in Example 7, a polycrystalline microstructure similar to that in Example 1 is maintained. On the other hand, in Comparative Example 8, the polycrystalline microstructure observed in Example 1 is completely broken, so that a polycrystalline microstructure is not formed in which carbide (cementite) wraps around the peripheries of ferrite crystal grains. It can be said that a chemical composition of the deposited metal of Example 7 is close to a critical condition for forming the polycrystalline microstructure in which cementite wraps around the peripheries of ferrite crystal grains.

Each of Examples 2 and 3 has a polycrystalline microstructure similar to that in Example 1. Although carbide ($Fe_3C$: cementite) is observed in grain boundaries of ferrite crystal grains as a matrix, the carbide does not exist in such a manner that it completely wraps around ferrite crystal grains (a plurality of cementite grains are locally precipitated in ferrite grain boundaries, so that cementite partially wraps around ferrite crystal grains). This tendency is more significantly exhibited in Example 3, as compared to Example 2. It can be said that a chemical composition of the deposited metal of Example 3 is close to a critical condition for forming the polycrystalline microstructure in which cementite partially wraps around ferrite crystal grains.

Example 4 has a polycrystalline microstructure similar to that in Example 1. In Example 4 and Comparative Examples 9 and 10 in which the Si concentration is increased with respect to that in Example 1, a change in polycrystalline microstructure is observed along with an increase in Si concentration. Specifically, a thickness of a carbide ($Fe_3C$: cementite) layer to be precipitated in the crystal grain boundaries becomes larger along with an increase in Si concentration, as in Comparative Examples 9 and 10. In this case, an oxide of Si ($SiO_2$) or a composite oxide of Si ($Fe_2SiO_4$) is likely to be simultaneously precipitated in the crustal grain boundaries. Comparative Example 9, in which the Si concentration is increased with respect to Example 1 up to 3.0%, has a polycrystalline microstructure similar to that in Example 1. However, due to the occurrence of aggregation of a substance precipitated in the crystal grain boundaries, an ability to wrap around ferrite crystal grains is deteriorated, so that a precipitated substance will also be observed in the crystal grains.

In Comparative Example 11 in which the Si concentration is reduced with respect to Example 1, the polycrystalline microstructure observed in Example 1 is completely broken, so that the polycrystalline microstructure is not formed in which carbide (cementite) wraps around the peripheries of ferrite crystal grains. It is understood that a chemical composition of the deposited metal of comparative Example 11 fails to form the polycrystalline microstructure in which cementite wraps around the peripheries of ferrite crystal grains.

Comparative Example 15 has a fine complicated polycrystalline microstructure. This is because approximately the entire region of a metal microstructure is formed as a martensite phase.

Example 5 has a polycrystalline microstructure similar (analogous) to that in Example 1. A matrix in Example 5 is a ferrite phase. Carbide ($Fe_3C$: cementite) is observed in crystal grain boundaries of the polycrystalline microstructure, and it can be ascertained that the carbide exists in such a manner that it wraps around ferrite crystal grains. Each of Comparative Examples 18 and 19 has a polycrystalline microstructure with a dendrite configuration. Approximately the entire region of this metal microstructure is formed as an austenite phase. In Comparative Example 20, approximately the entire region of a metal microstructure is formed as a martensite phase. A portion looking white in the metal microstructure of Comparative Example 20 is carbide ($Fe_3C$: cementite). Comparative Example 21 has a complicated polycrystalline microstructure in which three phases: a ferrite phase, a martensite phase and a carbide phase, mixedly exist. As above, in Comparative Examples 18 to 21, the polycrystalline microstructure is not formed in which carbide (cementite) wraps around the peripheries of ferrite crystal grains. In Comparative Example 14, a Cr content of the welding material is 50 mass %, i.e., is greater than 40 mass %, so that martensite is more likely to be produced, and it is therefore difficult to form a matrix as a ferrite phase.

Toughness and strength in each of the deposited metals of Examples 1 to 7 and Comparative Example 13 were checked. As a result, Examples 1 to 7 exhibited satisfactory values. On the other hand, Comparative Example 13 having a low Mn content was inferior to Examples 1 to 7 in terms of toughness and strength, and could not exhibit satisfactory values.

As described above in detail, according to one aspect of the present invention, there is provided a build-up welding material which contains C: 0.2 to 1.5 mass %, Si: 0.5 to 2 mass %, Mn: 0.5 to 2 mass %, Cr: 20 to 40 mass %, Mo: 2 to 6 mass %, Ni: 0.5 to 6 mass %, V: 1 to 5 mass % and W: 0.5 to 5 mass %, with the balance being Fe and unavoidable impurities.

Preferably, in the build-up welding material of the present invention, a deposited metal contains: C in an amount of 0.6 to 0.8 mass %; Si in an amount of 0.7 to 1.5 mass %; Mn in an amount of 0.7 to 1.5 mass %; Cr in an amount of 24 to 36 mass %; Mo in an amount of 3.5 to 4.5 mass %; Ni in an amount of 0.7 to 1.5 mass %; V in an amount of 1.5 to 2.5 mass %; and W in an amount of 0.7 to 1.5 mass %.

The build-up welding material of the present invention may further contain P: 0.03 mass % or less, and S: 0.02 mass % or less.

The build-up welding material of the present invention may further contain one or more selected from the group consisting of Ti, Co, Cu, Zr, Nb, Pd, Ag, Sn, Hf, Ta, Pt, Au and Pb, in a total amount of 15 mass % or less.

According to another aspect of the present invention, there is provided a deposited metal which is produced by build-up welding, wherein the deposited metal contains C: 0.2 to 1.5 mass %, Si: 0.5 to 2 mass %, Mn: 0.5 to 2 mass %, Cr: 20 to 40 mass %, Mo: 2 to 6 mass %, Ni: 0.5 to 6 mass %, V: 1 to 5 mass % and W: 0.5 to 5 mass %, with the balance being Fe and unavoidable impurities.

According to the above feature, the deposited metal of the present invention produced by build-up welding is formed in a metal microstructure having a ferrite matrix, in which cementite wraps around at least a part of the peripheries of ferrite grains. The ferrite matrix contains Cr, Mo and Ni. Ferrite is resistant to hydrogen embrittlement as compared to austenite and martensite, and corrosion resistance is enhanced based on Cr, Mo and Ni. Thus, the deposited metal of the present invention has an advantageous effect of being able to suppress hydrogen embrittlement, and cracking, and keep residual stress low and stable, even in an acidic atmosphere, and exhibits excellent corrosion resistance and abrasion resistance. In addition, it exhibits mechanical properties having a good balance between hardness and toughness.

An amount of Si in the deposited metal of the present invention is in the range of 0.5 to 2 mass %, which is less than that in the deposited metal disclosed in the Patent Document 1. Thus, a crack due to red scale is less likely to occur.

Preferably, the deposited metal of the present invention contains: C in an amount of 0.6 to 0.8 mass %; Si in an amount of 0.7 to 1.5 mass %; Mn in an amount of 0.7 to 1.5 mass %; Cr in an amount of 24 to 36 mass %; Mo in an amount of 3.5 to 4.5 mass %; Ni in an amount of 0.7 to 1.5 mass %; V in an amount of 1.5 to 2.5 mass %; and W in an amount of 0.7 to 1.5 mass %.

According to this configuration, the corrosion resistance, abrasion resistance and toughness can be further enhanced.

The deposited metal of the present invention may further contain P: 0.03 mass % or less, and S: 0.02 mass % or less.

The deposited metal of the present invention may further contain one or more selected from the group consisting of Ti, Co, Cu, Zr, Nb, Pd, Ag, Sn, Hf, Ta, Pt, Au and Pb, in a total amount of 15 mass % or less.

Preferably, the deposited metal of the present invention has a metal microstructure where a matrix comprises a plurality of ferrite grains, and a plurality of cementite grains are precipitated from ferrite grain boundaries. More preferably, the metal microstructure of the deposited metal is a polycrystalline microstructure having a matrix formed as a ferrite phase, wherein cementite exists in crystal grain boundaries of ferrite crystal grains, while wrapping around the peripheries of the ferrite crystal grains.

According to this feature, a plurality of cementite grains precipitated in the ferrite grain boundaries keep connection between respective ones of the ferrite grains, more preferably, the cementite wraps around the ferrite, so that the ferrite microstructure as a matrix is less likely to be cracked, as compared to an austenite microstructure and a martensite microstructure, and corrosion resistance to acids is enhanced.

According to yet another aspect of the present invention, there is provided a member which comprises a steel material serving as a base metal, and a deposited metal build-up welded on a surface of the steel material, wherein the deposited metal contains C: 0.2 to 1.5 mass %, Si: 0.5 to 2 mass %, Mn: 0.5 to 2 mass %, Cr: 20 to 40 mass %, Mo: 2 to 6 mass %, Ni: 0.5 to 6 mass %, V: 1 to 5 mass % and W: 0.5 to 5 mass %, with the balance being Fe and unavoidable impurities.

According to this configuration, the deposited metal build-up welded on the surface of the steel material as a base metal exhibits excellent corrosion resistance and abrasion resistance, and exhibits mechanical properties having a good balance between hardness and toughness, so that the member can be suitably used as a member of a pulverizer, a reactor or any other mechanical device for treating an acid substance.

Preferably, in the member of the present invention, the deposited metal contains: C in an amount of 0.6 to 0.8 mass %; Si in an amount of 0.7 to 1.5 mass %; Mn in an amount of 0.7 to 1.5 mass %; Cr in an amount of 24 to 36 mass %; Mo in an amount of 3.5 to 4.5 mass %; Ni in an amount of 0.7 to 1.5 mass %; V in an amount of 1.5 to 2.5 mass %; and W in an amount of 0.7 to 1.5 mass %.

According to this configuration, corrosion resistance, abrasion resistance and toughness of the member can be further enhanced.

In the member of the present invention, the deposited metal may further contain P: 0.03 mass % or less, and S: 0.02 mass % or less.

Preferably, in the member of the present invention, the deposited metal has a metal microstructure where a matrix comprises a plurality of ferrite grains, and a plurality of cementite grains are precipitated from ferrite grain boundaries. More preferably, the metal microstructure of the deposited metal is a polycrystalline microstructure having a matrix formed as a ferrite phase, wherein cementite exists in crystal grain boundaries of ferrite crystal grains, while wrapping around the peripheries of the ferrite crystal grains.

According to this configuration, a plurality of cementite grains precipitated in the ferrite grain boundaries keep connection between respective ones of the ferrite grains, more preferably, the cementite wraps around the ferrite, so that the ferrite microstructure as a matrix is less likely to be cracked, as compared to an austenite microstructure and a martensite microstructure, and corrosion resistance of the member to acids is further enhanced.

INDUSTRIAL APPLICABILITY

As above, the deposited metal formed from the build-up welding material of the present invention is suitable for use in an apparatus requiring excellent corrosion resistance and abrasion resistance, such as a pulverizer, a reactor or any other mechanical device for treating an acid substance or an object dug from acid soil, and has practical usability for such a purpose.

What is claimed is:

1. A build-up welding material containing C: 0.2 to 1.5 mass %, Si: 0.5 to 2 mass %, Mn: 0.5 to 2 mass %, Cr: 20 to 40 mass %, Mo: 2 to 6 mass %, Ni: 0.5 to 6 mass %, V: 1 to 5 mass % and W: 0.5 to 5 mass %, with the balance being Fe and unavoidable impurities.

2. The build-up welding material as defined in claim 1, containing: C in an amount of 0.6 to 0.8 mass %; Si in an amount of 0.7 to 1.5 mass %; Mn in an amount of 0.7 to 1.5 mass %; Cr in an amount of 24 to 36 mass %; Mo in an amount of 3.5 to 4.5 mass %; Ni in an amount of 0.7 to 1.5 mass %; V in an amount of 1.5 to 2.5 mass %; and W in an amount of 0.7 to 1.5 mass %.

3. The build-up welding material as defined in claim 1, further containing P: 0.03 mass % or less, and S: 0.02 mass % or less.

4. The build-up welding material as defined in claim 1, further containing one or more selected from the group consisting of Ti, Co, Cu, Zr, Nb, Pd, Ag, Sn, Hf, Ta, Pt, Au and Pb, in a total amount of 15 mass % or less.

5. A deposited metal produced by build-up welding, wherein the deposited metal contains C: 0.2 to 1.5 mass %, Si: 0.5 to 2 mass %, Mn: 0.5 to 2 mass %, Cr: 20 to 40 mass %, Mo: 2 to 6 mass %, Ni: 0.5 to 6 mass %, V: 1 to 5 mass % and W: 0.5 to 5 mass %, with the balance being Fe and unavoidable impurities.

6. The deposited metal as defined in claim 5, containing: C in an amount of 0.6 to 0.8 mass %; Si in an amount of 0.7 to 1.5 mass %; Mn in an amount of 0.7 to 1.5 mass %; Cr in an amount of 24 to 36 mass %; Mo in an amount of 3.5 to 4.5 mass %; Ni in an amount of 0.7 to 1.5 mass %; V in an amount of 1.5 to 2.5 mass %; and W in an amount of 0.7 to 1.5 mass %.

7. The deposited metal as defined in claim 5, further containing P: 0.03 mass % or less, and S: 0.02 mass % or less.

8. The deposited metal as defined in claim 5, further containing one or more selected from the group consisting of Ti, Co, Cu, Zr, Nb, Pd, Ag, Sn, Hf, Ta, Pt, Au and Pb, in a total amount of 15 mass % or less.

9. The deposited metal as defined in claim 5, having a metal microstructure where a matrix comprises a plurality of ferrite grains, and a plurality of cementite grains are precipitated from ferrite grain boundaries.

10. A member comprising a steel material serving as a base metal, and a deposited metal build-up welded on a surface of the steel material, wherein the deposited metal contains C: 0.2 to 1.5 mass %, Si: 0.5 to 2 mass %, Mn: 0.5 to 2 mass %, Cr: 20 to 40 mass %, Mo: 2 to 6 mass %, Ni: 0.5 to 6 mass %, V: 1 to 5 mass % and W: 0.5 to 5 mass %, with the balance being Fe and unavoidable impurities.

11. The member as defined in claim 10, wherein the deposited metal contains: C in an amount of 0.6 to 0.8 mass %; Si in an amount of 0.7 to 1.5 mass %; Mn in an amount of 0.7 to 1.5 mass %; Cr in an amount of 24 to 36 mass %; Mo in an amount of 3.5 to 4.5 mass %; Ni in an amount of 0.7 to 1.5 mass %; V in an amount of 1.5 to 2.5 mass %; and W in an amount of 0.7 to 1.5 mass %.

12. The member as defined in claim 10, wherein the deposited metal further contains P: 0.03 mass % or less, and S: 0.02 mass % or less.

13. The member as defined in claim 10, wherein the deposited metal has a metal microstructure where a matrix comprises a plurality of ferrite grains, and a plurality of cementite grains are precipitated from ferrite grain boundaries.

* * * * *